Inventor:
Georg Nauk,
by
His Attorney.

Patented June 11, 1929.

1,717,243

UNITED STATES PATENT OFFICE.

GEORG NAUK, OF BERLIN, GERMANY, ASSIGNOR TO GENERAL ELECTRIC COMPANY, A CORPORATION OF NEW YORK.

APPARATUS FOR WINDING ELECTRIC CONDENSERS.

Application filed December 18, 1925, Serial No. 76,320, and in Germany March 28, 1925.

My invention relates to apparatus for winding electric condensers.

The use of stationary condensers for phase compensation has hitherto failed owing to the difficulty of manufacturing satisfactory and cheap condensers. Of plate and rolled condensers mostly in use, rolled or cylinder condensers are preferred to a great extent on economical grounds.

An object of the invention is to provide a device for winding condensers in which the elements of the condenser while being wound are caused to pass against a device for forcing off the air from the condenser elements.

Figure 1:
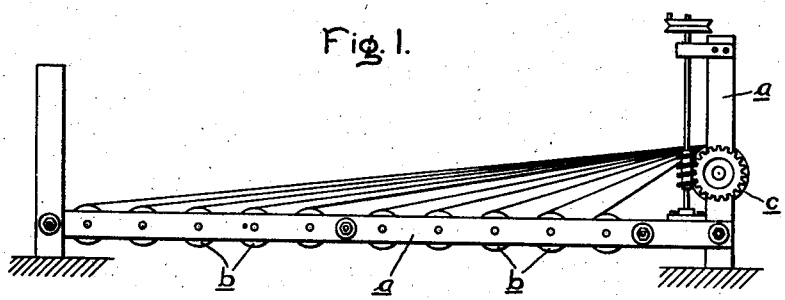
Figure 2:
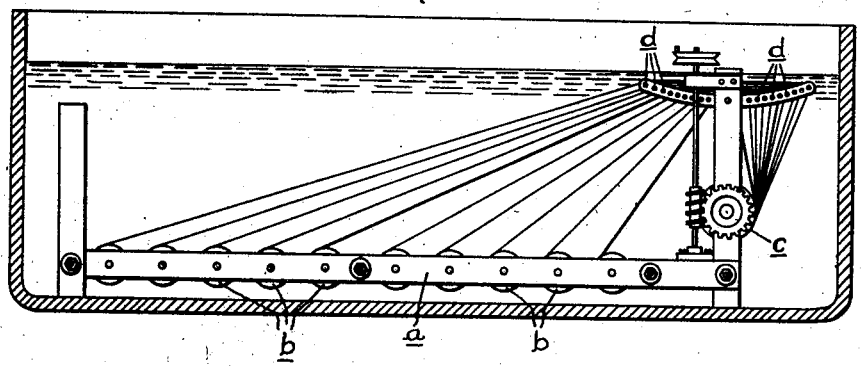

The invention is hereinafter more fully set forth and claimed, reference being had to the accompanying drawing, in which Fig. 1 shows an old form of device for winding condensers; Fig. 2 shows one form of device embodying the principles of my invention. The operation of this device takes place in a liquid, such as oil, or other suitable insulating liquid medium.

Referring more in detail to the drawing, it will be seen that in Fig. 1 a frame $a$ bears a number of supply rollers $b$ on which metal foil and insulation strips are rolled according to the number and order of the layers of the condenser to be wound. The ends of the insulation strips and foil strips are gathered together for the winding and are fastened to a condenser roller or shaft $c$ which lies parallel to the supply rollers. The winding is effected by turning the condenser roller. In order to ensure entire freedom from air after the winding and soaking, the roller condenser must be treated under vacuum.

According to the invention the air can be disengaged from the material in a simple manner by conducting the individual metal and insulation strips over or between stationary or rotating bars or guides. In this way air which may adhere to the strips can be stripped off. By a special arrangement of the guide bars the strips may be made to run down toward the condenser roller, so that when winding in the soaking medium the fine air bubbles can easily rise to the surface of the liquid. This new arrangement guarantees a winding of the condensers free from air and creases, and therefore renders the subsequent treatment in vacuum superfluous. A constructional example of the invention is represented diagrammatically in Fig. 2. The metal and insulating strips are rolled on rollers $b$ which are fitted in the frame $a$. Four rollers with insulating strips succeed each roller with metal strips. The metal strips are represented by thicker lines. According to the invention, the metal strips and also the insulating strips are not conducted directly to the condenser roller, but glide over guide bars $d$. These bars can be arranged in double sets so that the air is removed from both sides of the strips. The bars $d$ are suitably arranged higher than the roller $c$ so that the strips being wound are conducted in a downward direction to the periphery of the condenser roller. When the entire device works in a liquid medium, the rising of air bubbles is substantially facilitated through this arrangement and an extensive freedom from air of the condenser is obtained without vacuum treatment.

The tension of the strips can be adjusted by braking the supply rollers and be kept constantly even.

It will be understood that while I have illustrated and described my invention in connection with one form of device, I do not propose to be limited to the exact construction shown and described, inasmuch as, in view of the disclosure, variations may be readily made without departing from the spirit of the invention or from the scope of the claims contained herein.

What I claim as new and desire to secure by Letters Patent of the United States is:—

1. In combination, a vessel containing an insulating liquid medium, a winding device immersed in said medium, said device comprising a number of rolls for supporting strips of material, a shaft, guiding means for conducting the strips from said rolls to said shaft, means for rotating said shaft for winding said strips thereon, and guiding surfaces interposed between each roll and said shaft located above said rolls and said shaft whereby all of said strips, during the process of winding by the rotation of said shaft, are drawn first in an upward direction from the rolls and then in a downward direction toward the shaft for effectively dissociating air bubbles from the strips.

2. In combination, a vessel containing an insulating liquid medium, a winding device immersed in said medium, said device comprising a number of rolls for supporting strips of material, a shaft, guiding means for conducting the strips from said rolls to said shaft, means for rotating said shaft for winding said strips thereon, guiding surfaces interposed between each roll and said shaft located above said rolls and said shaft whereby all of said strips, during the process of winding by the rotation of said shaft, are drawn first in an upward direction from the rolls and then in a downward direction toward the shaft for effectively dissociating air bubbles from the strips, and means in engagement with said shaft and projecting out of the liquid whereby the shaft may be rotated from outside the liquid.

In witness whereof I have hereunto set my hand this 27th day of November, 1925.

GEORG NAUK.